W. HERON.
APPARATUS FOR PREPARING GROMETS OR PACKINGS FOR STUFFING BOXES.
APPLICATION FILED JUNE 26, 1909.

988,267.

Patented Mar. 28, 1911.

2 SHEETS—SHEET 1.

Witnesses.
A. J. Davies
H. Cooke.

Inventor
William Heron

W. HERON.
APPARATUS FOR PREPARING GROMETS OR PACKINGS FOR STUFFING BOXES.
APPLICATION FILED JUNE 26, 1909.

988,267.

Patented Mar. 28, 1911.

2 SHEETS—SHEET 2.

Witnesses.
M. J. Davies
H. Cooke.

Inventor.
William Heron

UNITED STATES PATENT OFFICE.

WILLIAM HERON, OF BIRKENHEAD, ENGLAND.

APPARATUS FOR PREPARING GROMETS OR PACKINGS FOR STUFFING-BOXES.

988,267.  Specification of Letters Patent.  Patented Mar. 28, 1911.

Application filed June 26, 1909. Serial No. 504,431.

*To all whom it may concern:*

Be it known that I, WILLIAM HERON, a subject of the King of Great Britain, and resident of Birkenhead, England, have invented certain new and useful Improvements in Apparatus for Preparing Gromets or Packings for Stuffing-Boxes, of which the following is a specification.

Hitherto it has been a tedious operation to fit the packing or gromets in the stuffing boxes of condenser tube plates because of the narrowness of the space and the necessity of the gromet filling closely the boxes. The usual gromets being very soft and pliable are very liable to stick and become deformed in passing them into the stuffing boxes so that they do not fit accurately.

My invention consists of mechanism designed to compress and shape and smooth the gromets whereby they are temporarily made thinner and stiffer so that they can be easily passed into the stuffing boxes without any liability of their sticking.

The invention is hereafter described with reference to the accompanying drawings whereon—

Figure 1:
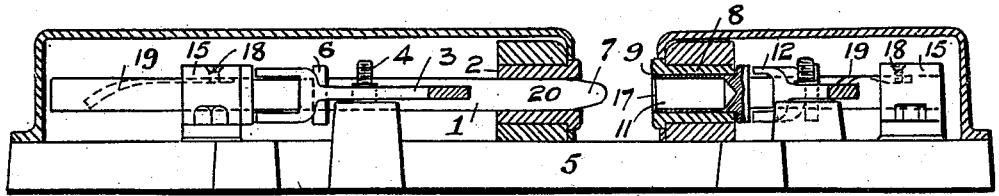
Figure 2:
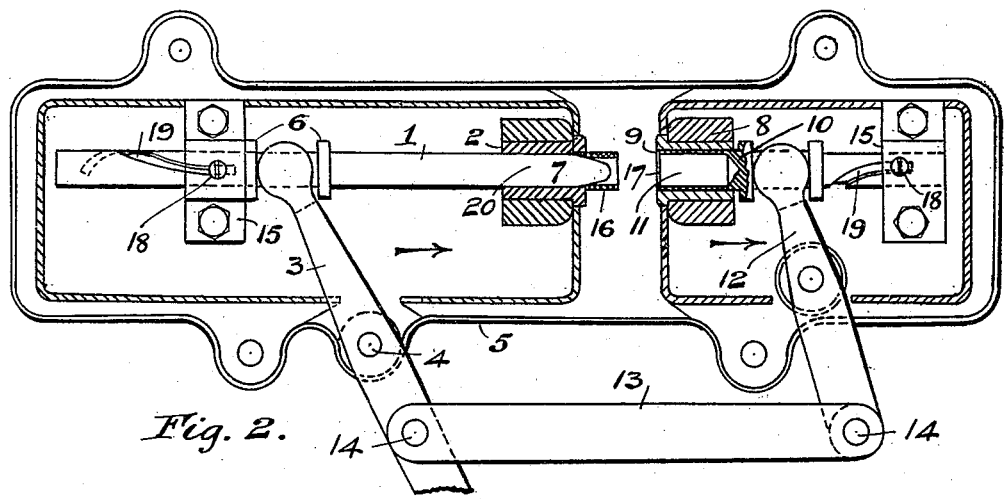
Figure 4:
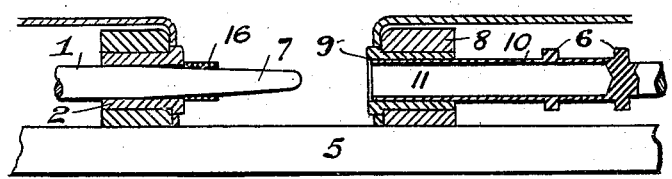
Figure 3:
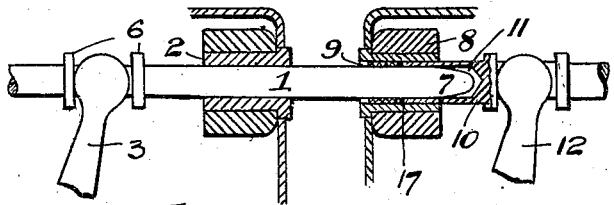

Figure 1 is longitudinal section and Fig. 2 a horizontal section of one arrangement under my invention. 1 is a plunger reciprocating through a hole in the guide block 2 by means of a lever 3 pivoted at 4 to the frame 5 which also carries the guide block 2; the forked end of the lever engaging with collars 6 on the plunger which latter has a tapering or reduced end 7. Opposite to the tapering end 7 is a die block 8 having a hole 9 therein of the diameter it is desired the outer surface of the gromet should be which will be just less than the inside diameter of the stuffing box the gromet is for. Within the hole 9 is a reciprocating plunger 10 of larger diameter than the plunger 1 and having a hollow 11 of the same diameter as the outside diameter of the parallel part of the plunger 1 so that the latter can slide and fit closely in the hollow 11 of the plunger 10 when they are moved together. The plunger 10 is also moved by a lever 12 similar to the lever 3 but of shorter length. The outer ends of the levers 3 and 12 are connected by a rod 13 pivoted thereto at such points 14 that the hollow plunger 10 has a shorter motion than the taper plunger 1, say about one to four, but any other convenient means of connecting and moving the plungers together may be used. The plungers are mounted in slides 15 or otherwise on the frame 5 so that they can freely reciprocate. When a gromet 16 (see Fig. 2) is placed on the taper end of the plunger 1 and the levers 3 and 12 moved in the direction of the arrow the plunger 10 withdraws into its block 8 leaving an annulus between the plunger 1 and the cylindrical interior of the block 8 and the plunger 1 pushes the gromet into the hole 9 and up against the end 17 of the plunger 10 the end part of the plunger 1 passing into the hollow 11 of the plunger 10; the parallel part of the plunger 1 thus compressing the gromet against the walls of the hole 9 as shown in Fig. 3 and solidifying such gromet into a size which can easily be passed into a stuffing box. On reversing the motion of the levers the taper plunger 1 is withdrawn and the hollow plunger 10 advances and pushes out the prepared gromet. To further smooth the gromet and obviate any liability of the plunger 1 crumpling up or distorting the gromet when pushing it into the hole 9, I cause either or both of the plungers 1 and 10 to rotate or partially rotate or oscillate preferably in opposite directions, when being reciprocated. This motion is, in Figs. 1. and 2., effected by pins 18 in the slides 15 engaging with helical grooves or cams 19 preferably of increasing twist or contour formed in or connected with the plungers 1 and 10, or the pins might be fixed to the plungers and engaged with cams or grooves on the frame; or in any other way rotary or oscillating motion may be given to the plungers. By this means the parallel parts 20 of the plunger 1 smooths more effectively the inner surface of the gromet while the end 17 of the hollow plunger 10 smooths the end of the gromet thus insuring that the gromet will bed uniformly against the bottom of the stuffing box and the exterior of the tube. In some cases when the gromets are of sufficiently stiff material the rotary motion may be dispensed with but in such cases the taper 7 on the plunger 1 must be of such fineness that the gromet will slide on the plunger easily without crumpling up or distorting when being pushed into the hole 9, as shown in Fig. 4.

Figure 5:
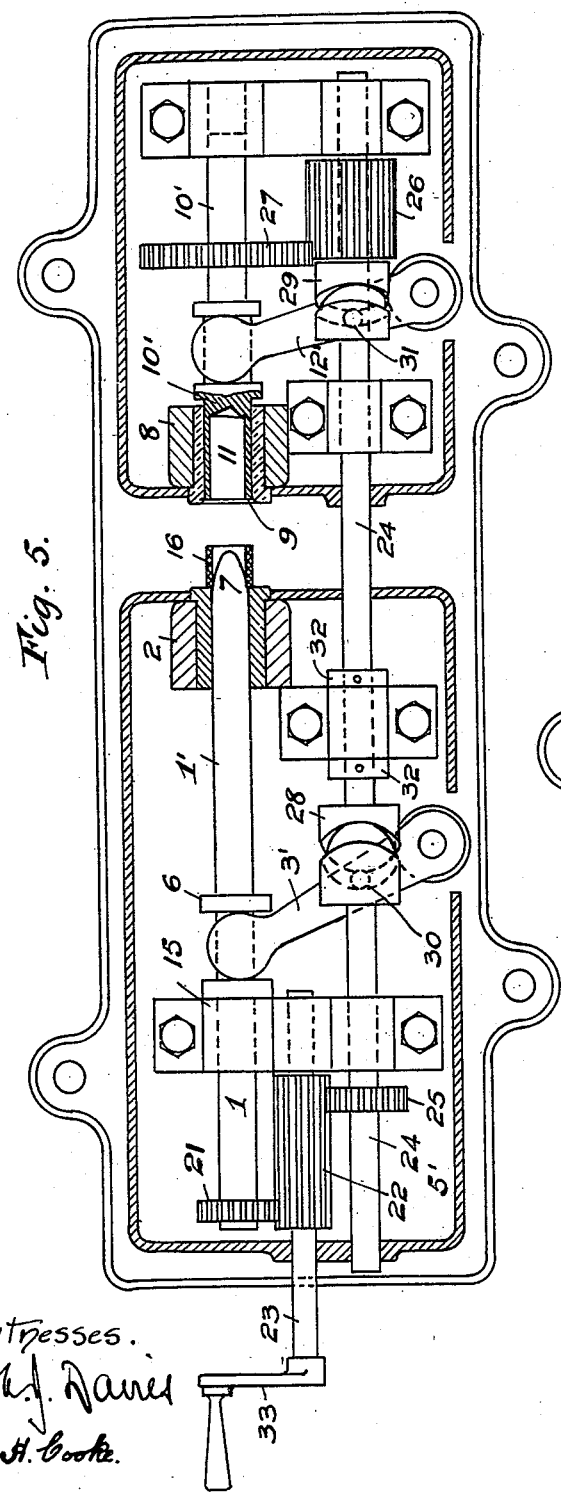

Fig. 5 is a horizontal section of a modification under my invention somewhat similar to Figs. 1 and 2, but in which continuous rotary motion is given to the plungers 1' and 10' by means of gearing. The plunger 1' has on its rear end a toothed wheel 21 gearing into a long toothed wheel 22 on a shaft 23 supported in bearings in the frame 5. 24 is another shaft also carried in bearings on the frame 5. 25 is a toothed wheel on the shaft 24 gearing into the wheel 22. 26 is another long toothed wheel on the other end of the shaft 24 and gearing with a toothed wheel 27 on the hollow plunger 10'. 28, 29, are cams on the shaft 24 engaging with pins 30, 31, on the lever 3' and 12' respectively to give the reciprocating motion to the plungers 1' and 10'. 32 are collars on the shaft 24 one on each side of one of the bearings to prevent end motion of such shaft. On turning the crank 33 attached to the shaft 23 the plungers 1' and 10' will be continuously rotated in opposite directions through the gearing 21, 22, 25, 26, 27, while the cams 28, 29, cause the said plungers to reciprocate, one with a longer travel than the other as before described, the long toothed wheels 22, 26, maintaining engagement with the wheels 21, 27, during the whole travel of the plungers. If found sufficient the plunger 1' alone may be rotated or partially rotated.

Figure 6:
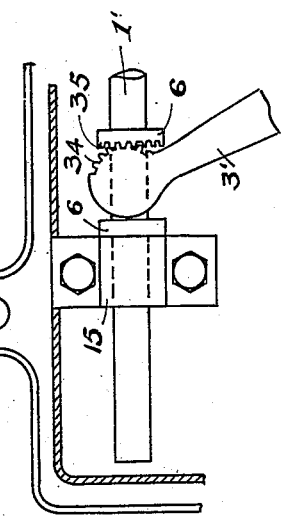

Fig. 6 is a fragmentary plan view showing another method of giving partial rotary or oscillatory motion to the plunger. In this case one of the forks of the lever 3 is toothed at 34 and gears with teeth 35 formed on one of the collars 6' on the plunger 1' so that as the lever 3' reciprocates the plunger it also partially rotates it.

Claims.

1. In apparatus for preparing gromets or packings; a fixed die block; a hollow plunger sliding therein; a taper plunger adapted to enter the hollow plunger, as both plungers slide in the same direction; an annulus between the taper plunger and the die block; and means for causing the taper plunger to enter the hollow plunger and compress a gromet into the annulus and against the receding hollow plunger.

2. In apparatus for preparing gromets or packings; a fixed die block; a hollow plunger sliding therein; a taper plunger adapted to enter the hollow plunger; an annulus between the taper plunger and the die block; and means for axially rotating the plungers and reciprocating them simultaneously in the same direction but at different relative speeds.

3. In apparatus for preparing gromets or packings; a die block the bore of which equals the required outer diameter of the gromet; a tapered plunger, of a maximum diameter equal to the required bore of the gromet, reciprocatory in said die block; a hollow plunger sliding in the die block and into which the tapered plunger enters; and means for reciprocating both plungers at different speeds.

4. In apparatus for preparing gromets or packings; a tapered plunger; means for rotating said plunger; a fixed die block to receive the tapered plunger; an annulus between the tapered plunger and die block; a hollow plunger sliding in said die block; means for rotating said hollow plunger; and operating levers controlling the simultaneous reciprocation of both plungers in the same direction but at different speeds.

In testimony whereof I affix my signature in presence of two witnesses.

WILLIAM HERON.

Witnesses:
HARRY COOKE,
A. J. DAVIES.

---

Copies of this patent may be obtained for five cents each, by addressing the "Commissioner of Patents, Washington, D. C."